Sept. 30, 1969  C. A. PIKE ET AL  3,470,320
FIBRE DEFLECTION MEANS
Filed Sept. 13, 1962  2 Sheets-Sheet 1

INVENTORS
CHARLES A. PIKE
NORMAN J. WOODLAND
BY
ATTORNEY

United States Patent Office 3,470,320
Patented Sept. 30, 1969

3,470,320
FIBRE DEFLECTION MEANS
Charles A. Pike, Ossining, and Norman J. Woodland, Chappaqua, N.Y., assignors to International Business Machines Corporation, New York, N.Y., a corporation of New York
Filed Sept. 13, 1962, Ser. No. 223,337
Int. Cl. H04n 3/16
U.S. Cl. 178—7.6      6 Claims

ABSTRACT OF THE DISCLOSURE

The invention is a scanning device comprising a flexible fiber optic anchored at one end and covered by a metal shield. The fiber is situated in the center of a variable force field so that the fiber may be positioned by the interaction of the force field with the metal shield in accordance with a scanning pattern.

---

This invention relates to scanning devices, and more particularly, to electro-mechanical scanning devices.

The first practical sequential scanning system employed a scanning disc. The scanning disc system consists of two discs having apertures arranged in a spiral around the circumference of each disc. The spirally arranged apertures have the effect of examining different areas of the object scanned, in sequence as the disc is rotated. The limit of speed for the scan is determined by the r.p.m. of the discs, and the area scanned and the sequence of scan is inflexible because the apertures must be prearranged in fixed locations.

A more flexible scanning system is the electronic cathode-ray tube flying spot scanner. It has the advantage of being able to scan an image from left to right and from top to bottom by deflecting an electron beam, but requires a high voltage and a vacuum tube for its operation.

There has been very little further practical development beyond the scanning discs of mechanical means for scanning a surface which would provide greater flexibility of the scanning device. "Scanning" as used in this application, means the traversing of an object or surface to sense or record a pattern thereon.

It is a paramount object of this invention to provide a high speed electro-mechanical scanning means.

It is a further object of the invention to provide means for the precise positioning of a mechanical scanning element in response to an applied force.

The above objects are realized in accordance with the invention by means of a device comprising a flexible fibre anchored at one end which is deflected by applying at least one force field of controllable magnitude to the fibre and including means for rendering the fibre responsive to the force field so that the fibre may be positioned thereby. In one form of the invention in which the device is used for scanning patterns, the flexible fibre is an element through which light may be transmitted, one end of which is anchored while the other is free to be moved by an intermediate field of force in accordance with a scanning pattern.

The invention has the advantage of requiring a lower voltage than is required in a cathode-ray tube flying-spot scanner. The apparatus also represents a considerable cost reduction over the more expensively manufactured cathode-ray tube.

Tests made have resulted in the free end of the fibre being deflected over a one-fourth square inch area. With the one half mil fibre used, the resolution obtained was comparable to conventional television systems.

A further advantage of the invention is its adaptability to miniaturization and its compatibility with low voltage solid state electronics.

When used as an image dissector, the invention has the advantage of requiring only a small photodector. The scanning disc system requires a large photodetector to collect the light admitted by the apertures because the apertures are located at different radii from the center of the disc.

Another advantage of the invention is that the scanning speed across the area being scanned can be held constant. This is not possible with the scanning disc because the speed of scan of the apertures across the area being scanned increases as the apertures become farther from the center of the disc. The present invention has the further advantage that the scanning pattern may be changed at will and is not physically fixed as is the case with the scanning disc.

A further advantage is that the apparatus of the invention requires only a single moving part which, because of its simplicity, requires no lubrication and very little maintenance.

The invention was conceived for use in the fields of image dissecting and flying-spot scanner apparatus but it is understood that the invention herein described may easily be adapted to display devices or various sorts of magnetic or optical scanning or recording devices including card readers, tag readers, etc.

The foregoing and other objects, features and advantages of the invention will be apparent from the following and more particular description of the preferred embodiments of the invention, as illustrated in the accompanying drawings:

Figure 1:
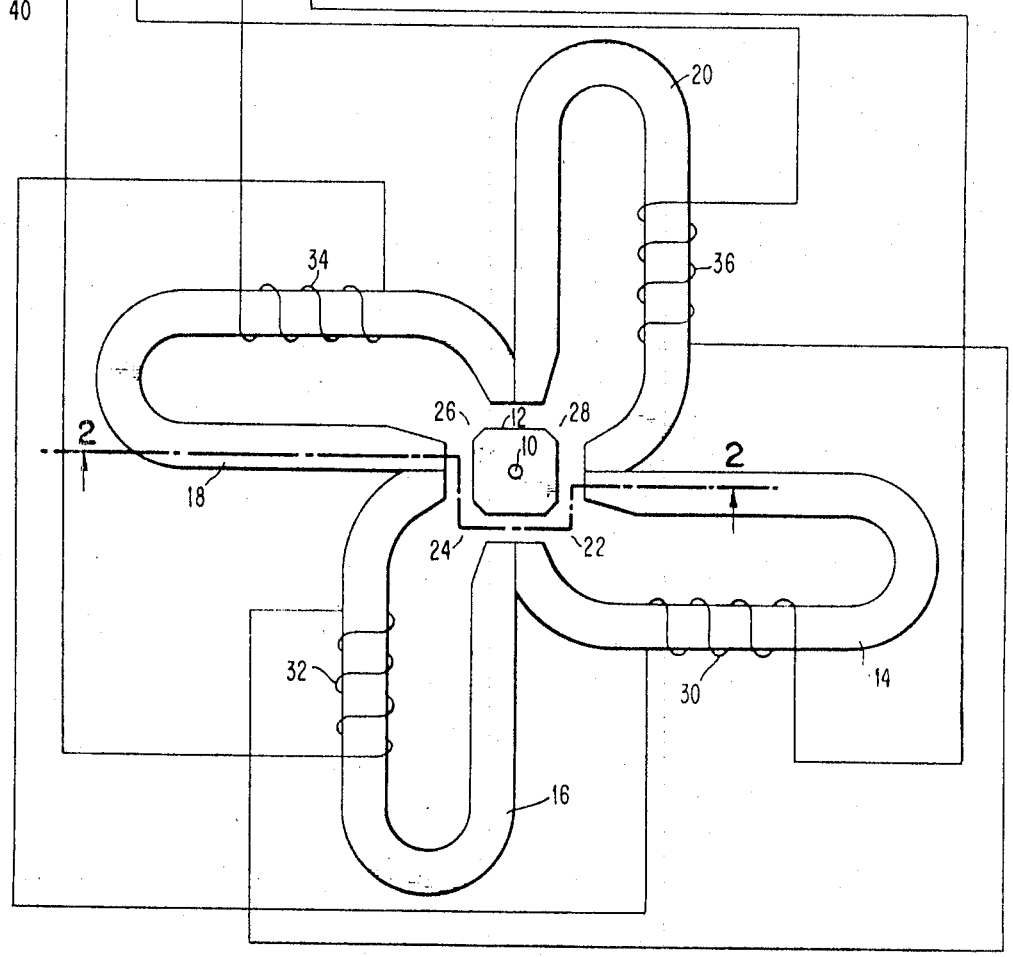
FIG. 1 is a plan view of a single fibre electromagnetic scanner which comprises one embodiment of the invention.
Figure 2:
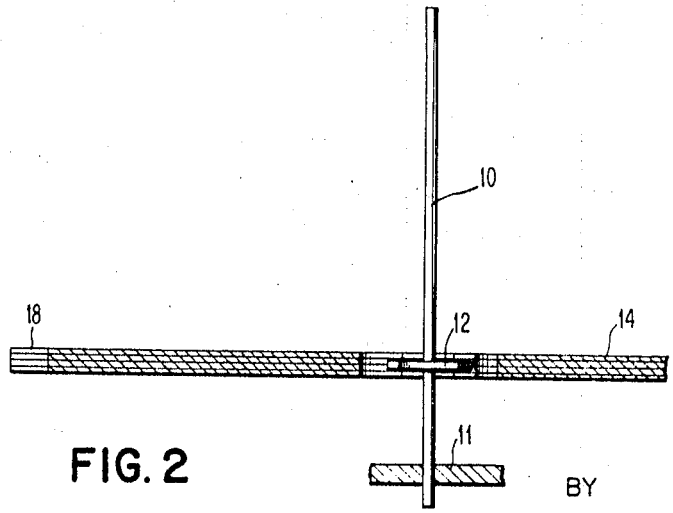
FIG. 2 is a vertical sectional view on the line 2—2 of FIG. 1.

Referring now to the electromagnetically driven scanner shown in FIGS. 1 and 2, a glass fibre 10 is fastened at one end to a stationary support 11. Attached to the fibre 10 is a metal armature 12. U-shaped polepieces 14, 16, 18, and 20 having air gaps 22, 24, 26, and 28 are placed perpendicular to the glass fibre 10. The armature 12 and the polepiece air gaps 22, 24, 26, and 28 are positioned so that lines flux produced in any one of the polepieces will cut through the armature. Windings 30, 32, 34 and 36 are provided on each of the respective polepieces 14, 16, 18, and 20. If a current is passed through any one of the windings, a flux will be produced in the corresponding polepiece in direct proportion to the magnitude of current. The flux so produced will bridge the gap of the respective polepiece and pull the armature 12 towards that respective polepiece.

It should be readily apparent to those skilled in the art that the motion of the glass fibre 10 can now be controlled in a manner similar to that by which the beam from an electron gun of a cathode-ray tube is controlled by the horizontal and the vertical deflection plates therein. Windings 32 and 36 are, therefore, connected in series; windings 34 and 30 are also connected in series; and voltages to control vertical and horizontal deflections are impressed across each of the two series combinations, as illustrated by vertical deflection circuit 38 and horizontal deflection circuit 40. Scanning control may then be effected in two dimensions; that is horizontally across the area scanned, and vertically up and down the area scanned.

Figure 3:
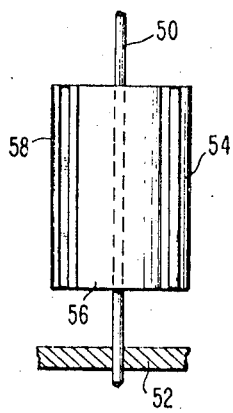
FIG. 3 is a vertical elevation of a single fibre electrostatic scanner which is a second embodiment of the invention.
Figure 4:
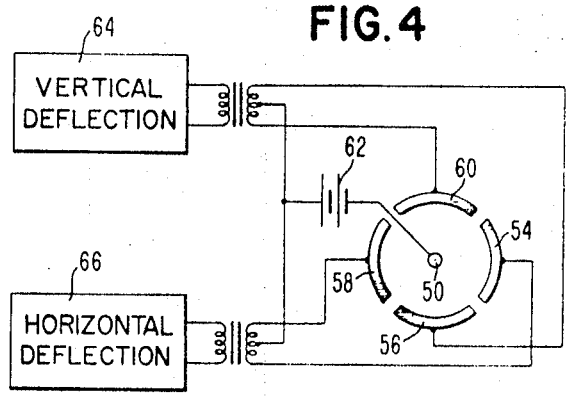
FIG. 4 is a circuit diagram of a scanner using a single fibre electrostatic scanning element of the type shown in FIG. 3.

An embodiment of the invention using electrostatic deflection of a glass fibre is shown in FIGS. 3 and 4. The fibre 50 is coated with a suitable electrically conductive medium, such as a metallic thin film, to render the fibre susceptible to control by an electrostatic field. The fibre is clamped at one end by a stationary clamping means 52. If desired, a negative voltage may be applied to the fibre by voltage source 62 in order to place an electrostatic charge on the fibre via the metallic thin film thereon. It is possible to obtain deflection without the voltage source 62. All that is necessary is that the center tap of each transformer be connected to the fibre. Deflection is achieved by a charge difference being established between the metallic film on the fibre and the deflection plates due to the potentials developed at the center-tapped transformers. The use of a voltage source is preferred in order to achieve greater deflection than would be possible otherwise. Deflection plates 54, 56, 58, and 60 are placed parallel to the fibre 50. Opposite plates 54 and 58, 56 and 60, may be energized to deflect the fibre in any desired pattern by means of vertical deflection circuits 64 and horizontal deflection circuits 66.

Figure 5:
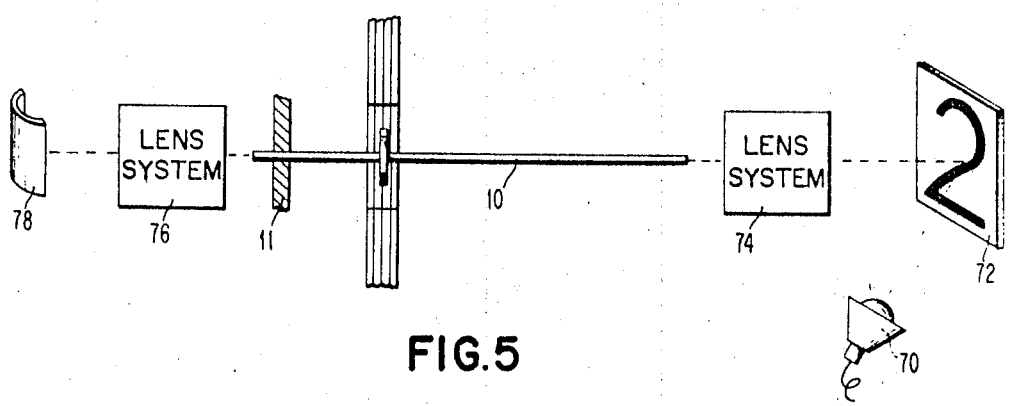
FIG. 5 is a schematic view of an image dissector apparatus embodying the invention; and, FIG. 6 is a schematic view of a flying-spot scanner device in which the invention is embodied.

In FIG. 5 the invention is utilized in an image dissector device. Light from light source 70 reflects from the surface 72 of the image to be dissected. The light reflected is shown by the broken line and passes through a lens system 74 which is a lens system for collimating light rays. Light from the lens system 74 is picked up by the magnetically deflected fibre 10 and passes through the fibre to a second lens system 76, which focuses the light beam on a photocell 78. The magnitude of the current through the photocell is directly proportional to the brightness of the image at the particular points along the scanning path of fibre 10. Thus, the image 72 is broken down into a series of electrical pulses proportional to the magnitude of light reflected from the image.

Figure 6:
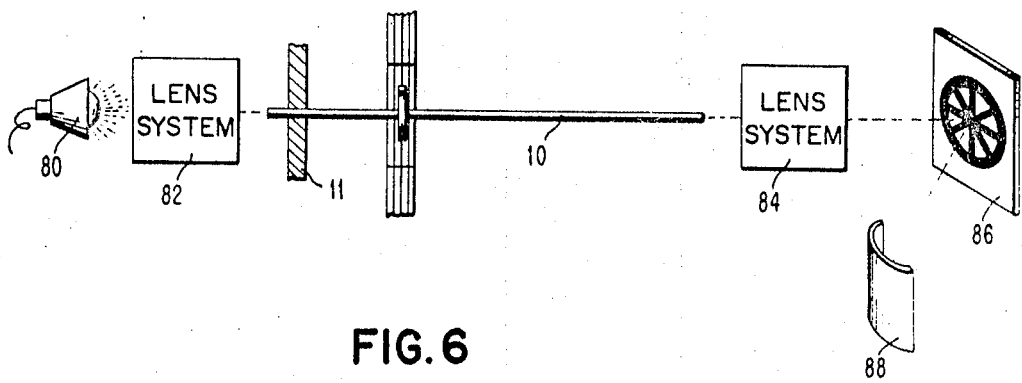

A flying-spot scanner is shown in FIGURE 6. The light source 80 passes light through lens system 82 which focuses the light through the stationary end of the fibre 10. By deflecting the fibre 10, the light beam can be directed through lens system 84 onto the image surface 86. This flying-spot scanner may be utilized by placing a photocell 88 near the surface 86. The voltage variation at the photocell is indicative of the intensity at the portion of the image illuminated by the flying-spot.

In summary, the invention comprises a flexible fibre anchored at one end and provided with means to render the fibre responsive to a force field, whereby the free end of the fibre may be deflected in accordance with a prescribed scanning pattern, by application of a variable force field in proximity with the fibre.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A scanning device comprising:
   a flexible radiant energy conducting fibre having a first end free to move;
   means for securely fixing a second end of said fibre;
   means for creating at least one two-dimensional force field in proximity with said fibre said last mentioned means including means for varying said force field in at least two dimensions; and,
   means for rendering said fibre responsive to said force field so as to move said first end in a prescribed scanning path.

2. A device for effecting controlled deflection of a flexible fibre comprising in combination:
   means for mounting said fibre so that one end thereof is fixed while the other end is free to move;
   means for creating at least one magnetic field in proximity to said fibre, including means to vary said magnetic field in a prescribed manner in at least two dimensions; and,
   armature means attached to said fibre whereby the unfixed end of said fibre may be deflected in accordance with a prescribed scanning pattern by variations in said magnetic field.

3. In combination:
   a source of radiant energy;
   a device located out of the normal direct path of said radiant energy for response thereto;
   means to convey the energy from said source to the device comprising a flexible radiant energy conducting fibre, means for holding one end of said fibre stationary with respect to said source;
   means for creating a force field, in proximity to said fibre, which is variable in a prescribed manner in at least two dimensions;
   and means for rendering said fibre responsive to said force field.

4. In combination:
   an element having a surface to be scanned;
   a source of radiant energy for illuminating said surface;
   a relatively flexible light conducting fibre anchored at one end;
   means for generating a force field, in proximity to said fibre, variable in a prescribed manner in at least two dimensions;
   means for rendering said fibre responsive to said force field for causing movement of said fibre relative to said surface in the path of light reflected from said surface; and,
   means located at the anchored end of said fibre responsive to the intensity of the light transmitted through said fibre from said surface.

5. In combination: a stationary support means; an elongated, flexible member including optical fiber means and having a first end affixed to said stationary support means and having a free end; means defining an image area; and deflecting means positioned adjacent said fiber member for deflecting said elongated member to produce a controlled scanning movement across said image area of said free end thereof, said optical fiber means conducting light signals from said image area to said first end of said elongated member.

6. In combination: means for defining an image plane; a flexible elongated light transmitting element having a first end fixed and having a second free end positioned adjacent said image plane; and means for producing a controlled scanning movement of said free end of said light transmitting element with respect to said image plane.

(References on following page)

References Cited

UNITED STATES PATENTS

| | | | |
|---|---|---|---|
| 3,112,360 | 11/1963 | Gregg | 178—7.6 |
| 3,016,785 | 1/1962 | Kapany | 88—1 |
| 1,751,584 | 3/1930 | Hansell | 178—6.7 |

OTHER REFERENCES

Zworykin et al.: Television, Wiley and Sons, New York, 1940 TK 6630 Z8, pp. 216–219, and 445.

Fiber Optics edited by Kapany, Appendix N of Concept of Classical Optics by Strong published by W. H. Freeman and Co., 1958 pages, 562–593 relied on.

Applied Electrical Measurements, I. Kinnard, Wiley and Sons, New York, 1956, TK 275 K5.

RICHARD MURRAY, Primary Examiner

U.S. Cl. X.R.

178—7.1, 7.5